(12) United States Patent
Chen et al.

(10) Patent No.: US 8,856,385 B1
(45) Date of Patent: Oct. 7, 2014

(54) IMAGE DISPLAY METHOD AND APPARATUS

(71) Applicant: Huawei Technologies Co., Ltd., Guangdong (CN)

(72) Inventors: Pu Chen, Shenzhen (CN); Tianxi Xu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 14/143,852

(22) Filed: Dec. 30, 2013

Related U.S. Application Data

(63) Continuation of application No. PCT/CN2013/080728, filed on Aug. 2, 2013.

(51) Int. Cl.
G06F 15/16 (2006.01)
G06F 15/177 (2006.01)
H04L 29/08 (2006.01)
G06F 17/30 (2006.01)

(52) U.S. Cl.
CPC .......... H04L 67/10 (2013.01); G06F 17/30905 (2013.01); H04L 29/08756 (2013.01); G06F 17/30283 (2013.01)
USPC .......................................... 709/246; 709/220

(58) Field of Classification Search
CPC ... G06F 3/14; G06F 3/1415; G06F 17/30905; G06F 17/30244; G06F 17/30265; G06F 17/30268; G06F 17/30283; H04L 29/08702; H04L 29/08756; H04L 67/2852; H04N 1/001; H04N 1/00228
USPC ................... 709/220, 227, 231, 246; 715/744
See application file for complete search history.

(56) References Cited

U.S. PATENT DOCUMENTS

| | | | |
|---|---|---|---|
| 2007/0288640 A1* | 12/2007 | Schmieder | 709/227 |
| 2009/0102838 A1 | 4/2009 | Bullard | |
| 2009/0154572 A1* | 6/2009 | Baik et al. | 375/240.25 |
| 2009/0284442 A1* | 11/2009 | Pagan | 345/2.1 |
| 2010/0111410 A1* | 5/2010 | Lu et al. | 382/166 |
| 2010/0306413 A1 | 12/2010 | Kamay | |
| 2011/0219122 A1 | 9/2011 | Mahajan | |
| 2012/0069036 A1 | 3/2012 | Dharmapurikar | |

FOREIGN PATENT DOCUMENTS

| | | |
|---|---|---|
| CN | 101849224 A | 9/2010 |
| CN | 102196033 A | 9/2011 |
| CN | 102203760 A | 9/2011 |

* cited by examiner

Primary Examiner — Brian J Gillis
(74) Attorney, Agent, or Firm — Huawei Technologies Co., Ltd

(57) ABSTRACT

Embodiments of the present invention provide an image display method, apparatus, and system. After an image display instruction is obtained, an application program that triggers the image display instruction is determined, and an image is processed according to the application program and is sent to a client for display. Because image processing is performed according to an application program currently triggered by the client, a determined image processing policy meets current application requirements of the client, which avoids the problem in the prior art that an image finally displayed on the client does not meet current application requirements of the client when an image processing policy is determined according to image type recognition.

16 Claims, 6 Drawing Sheets

IMAGE DISPLAY METHOD AND APPARATUS

CROSS-REFERENCE TO RELATED APPLICATIONS

This application is a continuation of International Patent Application No. PCT/CN2013/080728, filed on Aug. 2, 2013, which is hereby incorporated by reference in its entirety.

TECHNICAL FIELD

Embodiments of the present invention relate to computer technologies, and in particular, to an image display method, system, and apparatus.

BACKGROUND

When a user logs in to a remote computer, the remote computer needs to transfer its desktop content to a client by using a remote desktop technology, and a local device of the client displays the desktop content of the remote computer. At present, most remote desktop systems transfer remote desktop content based on an IP network. A remote desktop may include such technologies as desktop image display, remote sound transmission, or pluggable hardware mapping of a remote computer. A remote desktop is also known as a virtual desktop. In a virtual desktop scenario, at least one server and one client exist. Login to a remote server is implemented by using virtual desktop client software installed on the client.

A desktop image can be transferred to the client by using a drawing instruction. For example, the client receives such instructions, which are sent by the remote computer, as "fill region XX with color XX", "draw an XX-wide with color XX line from point XX to point XX", or "draw image XX in position XX". For the last drawing instruction, because it carries image information that occupies a bandwidth, the remote computer will, when sending the drawing instruction to the client, process the image according to a certain policy, for example, an image compression policy, to reduce the amount of data transferred between the remote computer and the client and reduce the bandwidth occupancy ratio. Which policy is used by the remote computer to process an image to be sent to the client mainly depends on an image recognition technology in the prior art. The remote computer recognizes an image type, and determines a corresponding processing policy according to a different image type. However, this technology depends on image type recognition by the remote computer. Determining an image processing policy according to the image type may make image data transmitted to the client fail to meet client requirements. For example, after the remote computer performs lossy compression on a recognized image and then transmits the image to the client to display, the image cannot meet the high image quality requirement of the client, which affects user experience.

SUMMARY

Embodiments of the present invention provide an image display method, apparatus, and system, which no longer use a method of determining an image processing policy according to an image type, but use an image processing method much closer to client requirements to display an image according to client requirements.

In a first aspect, an embodiment of the present invention provides an image display method, including:

obtaining an image display instruction, where the image display instruction carries an image to be displayed;

determining an application program that triggers the image display instruction;

processing, according to the application program, the image to be displayed; and sending an image display message to a client, so that the client displays an image according to the image display message, where the image display message includes the processed image to be displayed.

With reference to the first aspect, in a first possible implementation manner, the processing, according to the application program, the image to be displayed includes:

determining, according to the application program, an image processing policy for the image to be displayed; and processing, according to the image processing policy, the image to be displayed.

With reference to the first possible implementation manner of the first aspect, in a second possible implementation manner, the method further includes:

pre-configuring a mapping relationship between the application program and the image processing policy, where correspondingly, the determining, according to the application program, an image processing policy for the image to be displayed includes:

querying the mapping relationship according to the application program, and determining the image processing policy for the image to be displayed.

With reference to the first aspect or the second possible implementation manner of the first aspect, in a third possible implementation manner, the pre-configuring a mapping relationship between the application program and the image processing policy includes:

configuring a first mapping relationship, where the first mapping relationship includes image compression policies corresponding to different application programs.

The image compression policy includes a lossless compression policy, and the configuring a first mapping relationship includes: configuring a first mapping relationship between the lossless compression policy and first type application software, or configuring a first process name set that uses the lossless compression policy; or, the image compression policy includes a lossy compression policy, and the configuring a first mapping relationship includes: classifying the lossy compression policy into multiple lossy compression levels, and configuring a corresponding application software type for each lossy compression level, or configuring a corresponding process name set for each lossy compression level.

With reference to the first aspect or the second possible implementation manner of the first aspect, in a fourth possible implementation manner, the pre-configuring a mapping relationship between the application program and the image processing policy includes:

configuring a second mapping relationship, where the second mapping relationship includes image frequency control policies corresponding to different application programs.

The image compression policy includes an image frequency control policy whose value is lower than a default value, where the default value is a default image display frame rate or delay time of a system; and the configuring a second mapping relationship includes:

configuring a second mapping relationship between the image frequency control policy whose value is lower than the default value and second type application software, or configuring a second process name set that uses the image frequency control policy whose value is lower than the default value.

With reference to the first aspect or the second possible implementation manner of the first aspect, in a fifth possible implementation manner, the pre-configuring a mapping relationship between the application program and the image processing policy includes:

configuring a third mapping relationship, where the third mapping relationship includes cursor rendering policies corresponding to different application programs.

Where, the cursor rendering policy includes a server cursor rendering policy, and the configuring a third mapping relationship includes:

configuring a third mapping relationship between the server cursor rendering policy and third type application software, or configuring a third process name set that uses the server cursor rendering policy.

With reference to the first aspect or all the foregoing possible implementation manners of the first aspect, in a sixth possible implementation manner, the determining an application program that triggers the image display instruction includes:

determining a process currently associated with the image display instruction.

With reference to the sixth possible implementation manner of the first aspect, in a seventh possible implementation manner, the determining a process currently associated with the image display instruction includes: querying for a name of the process currently associated with the image display instruction from an operating system; or, querying for an identifier of the process currently associated with the image display instruction from an operating system, and determining a process name according to the identifier of the process; or obtaining a name of the process currently associated with the image display instruction that is carried in the image display instruction; or, obtaining an identifier of the process currently associated with the image display instruction that is carried in the image display instruction, and determining a process name according to the identifier of the process.

In a second aspect, an embodiment of the present invention provides an image display apparatus, including:

an obtaining unit, adapted to obtain an image display instruction, where the image display instruction carries an image to be displayed;

a determining unit, adapted to determine an application program that triggers the image display instruction;

a processing unit, adapted to process, according to the application program determined by the determining unit, the image to be displayed; and a sending unit, adapted to send an image display message to a client, so that the client displays an image according to the image display message, where the image display message includes the image to be displayed that has been processed by the processing unit.

In a third aspect, an embodiment of the present invention provides an image display system, including:

a server, adapted to obtain an image display instruction, where the image display instruction carries an image to be displayed, determine an application program that triggers the image display instruction, process, according to the application program, the image to be displayed, and send an image display message to a client, where the image display message includes the processed image to be displayed; and the client, adapted to receive the image display message sent by the server, and display an image according to the image display message.

In a fourth aspect, an embodiment of the present invention provides a computer, including an application program module, an operating system module, an display driver module, and a remote communication module, where: the operating system module is adapted to send an image display instruction to the display driver module according to a call instruction of the application program module; the display driver module sends the image display instruction to the remote communication module after receiving the image display instruction sent by the operating system module; and the remote communication module is adapted to obtain the image display instruction sent by the display driver module, where the image display instruction carries an image to be displayed, determine an application program that triggers the image display instruction, process, according to the application program, the image to be displayed, and send an image display message to a client, so that the client displays an image according to the image display message, where the image display message includes the processed image to be displayed.

In a fifth aspect, an embodiment of the present invention provides a computer, including a processor, a memory, a bus, and a communication interface, where:

the memory is adapted to store a computer execution instruction; the processor is connected to the memory through the bus; and when the computer is running, the processor executes the computer execution instruction stored in the memory, so that the computer executes the following method:

obtaining an image display instruction, where the image display instruction carries an image to be displayed;

determining an application program that triggers the image display instruction;

processing, according to the application program, the image to be displayed; and sending an image display message to a client, so that the client displays an image according to the image display message, where the image display message includes the processed image to be displayed.

In a sixth aspect, an embodiment of the present invention provides a computer readable medium that includes a computer execution instruction, where, when a processor of a computer executes the computer execution instruction, the computer executes the following method:

obtaining an image display instruction, where the image display instruction carries an image to be displayed;

determining an application program that triggers the image display instruction;

processing, according to the application program, the image to be displayed; and sending an image display message to a client, so that the client displays an image according to the image display message, where the image display message includes the processed image to be displayed.

In embodiments of the present invention, after an image display instruction is obtained, an application program that triggers the image display instruction is determined, and an image is processed according to the application program and is sent to a client for display. Because image processing is performed according to an application program currently triggered by the client, a determined image processing policy meets current application requirements of the client, which avoids the problem in the prior art that an image finally displayed on the client does not meet current application requirements of the client when an image processing policy is determined according to image type recognition.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide an image display method, apparatus, and system, which avoid using a method of determining an image processing policy according to an image type, but use an image policy determining method much closer to client requirements to meet different image display requirements of clients.

Embodiment 1

Figure 1:
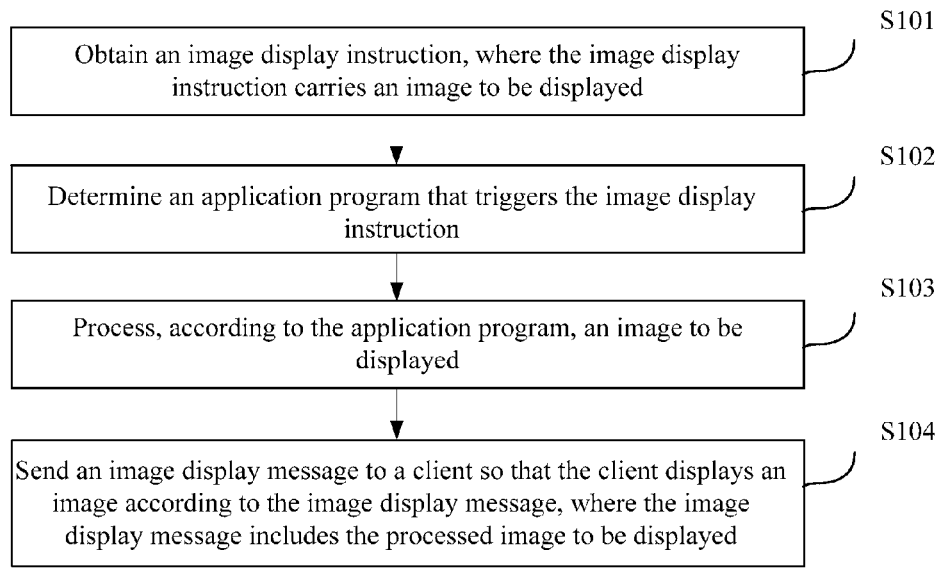
FIG. 1 is a flowchart of a method according to an embodiment of the present invention.

FIG. 1 is a flowchart according to an embodiment of the present invention. An image display method provided in the embodiment of the present invention includes the following steps.

S101. Obtain an image display instruction, where the image display instruction carries an image to be displayed.

Preferably, in the embodiment of the present invention, an image processing module configured in a remote computer or a server may obtain an image display instruction from any module of an operating system module, a display driver module, or a remote communication module of the remote computer or the server. In a specific implementation, the image processing module may be configured in any of the operating system module, the display driver module, or the remote communication module, or may be configured independently. Any specific implementation manner of the image processing module can implement the image display method according to the embodiment of the present invention, and the specific implementation thereof is not limited by the embodiment of the present invention.

S102. Determine an application program that triggers the image display instruction.

In the embodiment of the present invention, after receiving a display instruction, the image processing module needs to search for a source that triggers the display instruction to determine which application program or application programs trigger the image display instruction.

S103. Process, according to the application program, the image to be displayed.

In the embodiment of the present invention, processing on the image to be displayed no longer depends on image recognition; instead, corresponding image processing is performed according to the application program that triggers the image display instruction.

Preferably, S103 includes the following:

S103-1. Determine, according to the application program, an image processing policy for the image to be displayed.

After the application program is determined, the image processing policy is determined according to information of the application program. Preferably, a pre-configured image processing policy may be determined according to a type of the application program or a name of the application program. The specific implementation manner will be described in detail in subsequent embodiments.

S103-2. Process, according to the image processing policy, the image to be displayed.

Processing the image according to the policy may be based on the purpose of saving a transmission bandwidth, or based on the purpose of meeting customer requirements, or based on both the two purposes. However, the image processing is performed based on the image processing policy determined in S103-2.

S104. Send an image display message to a client, so that the client displays an image according to the image display message, where the image display message includes the processed image to be displayed.

In this embodiment, after an image display instruction is obtained, an image processing module configured in the remote computer or server determines an application program that triggers the image display instruction, processes an image according to the application program, and sends the image to a client for display. Because image processing is performed according to an application program currently triggered by the client, a determined image processing policy meets current application requirements of the client, which avoids the problem in the prior art that an image finally displayed on the client does not meet current application requirements of the client when an image processing policy is determined according to image type recognition.

Embodiment 2 of the Present Invention

Figure 2:
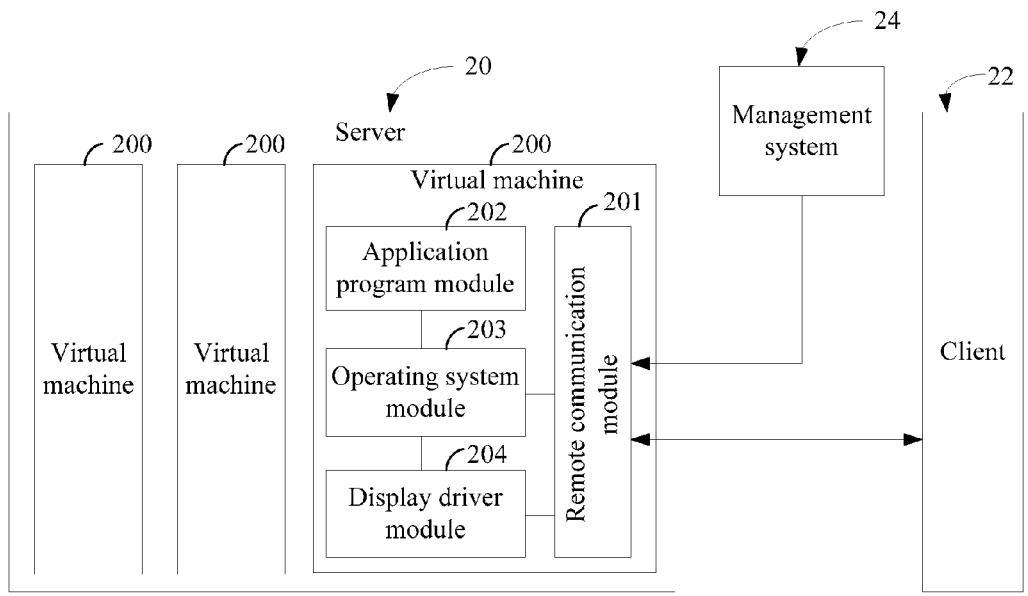
FIG. 2 is an architecture diagram of a system according to an embodiment of the present invention.

FIG. 2 is an architecture diagram of a system according to an embodiment of the present invention. The system includes a server 20. The server 20 may include multiple virtual machines VM200, and each virtual machine VM200 includes a remote communication module 201, an application program module 202, an operating system module 203, and a display driver module 204, where: the remote communication module 201 is adapted to enable a VM on which the module is located to communicate with the exterior, for example, to communicate with a client or a management system, read a display instruction uploaded by a display driver, send the display instruction to the client, receive a user mouse and keyboard operation event sent by the client, and report the event to the operating system module 203; the application program module 202 runs in user mode and is adapted to initiate a call instruction to the operating system module 203 to provide service implementation; the operating system module 203 is adapted to manage hardware resources of the server, control the running of other modules, and provide an interactive operation interface for users. In this embodiment, the operating system module 203 is adapted to send an image display instruction to the display driver module 204 according to the call instruction from the application program module 202; and the display driver module 204 performs uniform format conversion for the instruction sent by the operating system module 203 after receiving the image display instruction sent by the operating system module 203, and then sends the converted image display instruction to the remote communication module 201, to instruct the remote communication module 201 to send, through a remote communication protocol, image display information to a client. Certainly, the display driver module 204 may perform no format conversion, but the remote communication module 201 performs the format conversion.

Additionally, in the system embodiment of the present invention, the remote communication module 201 further implements the functions of an image processing module, that is, the remote communication module 201 is further adapted to obtain an image display instruction, determine an application program that triggers the image display instruction, determine, according to the application program, an image processing policy for an image to be displayed, process, according to the image processing policy, the image to be displayed, and send image display information to a client, so that the client displays an image according to the image display message, where the image display information includes the processed image to be displayed.

In this embodiment, the remote communication module 201 implements functions of the image processing module. In other embodiments, functions of the image processing module may also be implemented by the operating system module 203 or the display driver module 204, or, an image processing module is configured independently. The specific implementation of the image processing module is not limited by the embodiments of the present invention.

Figure 3:
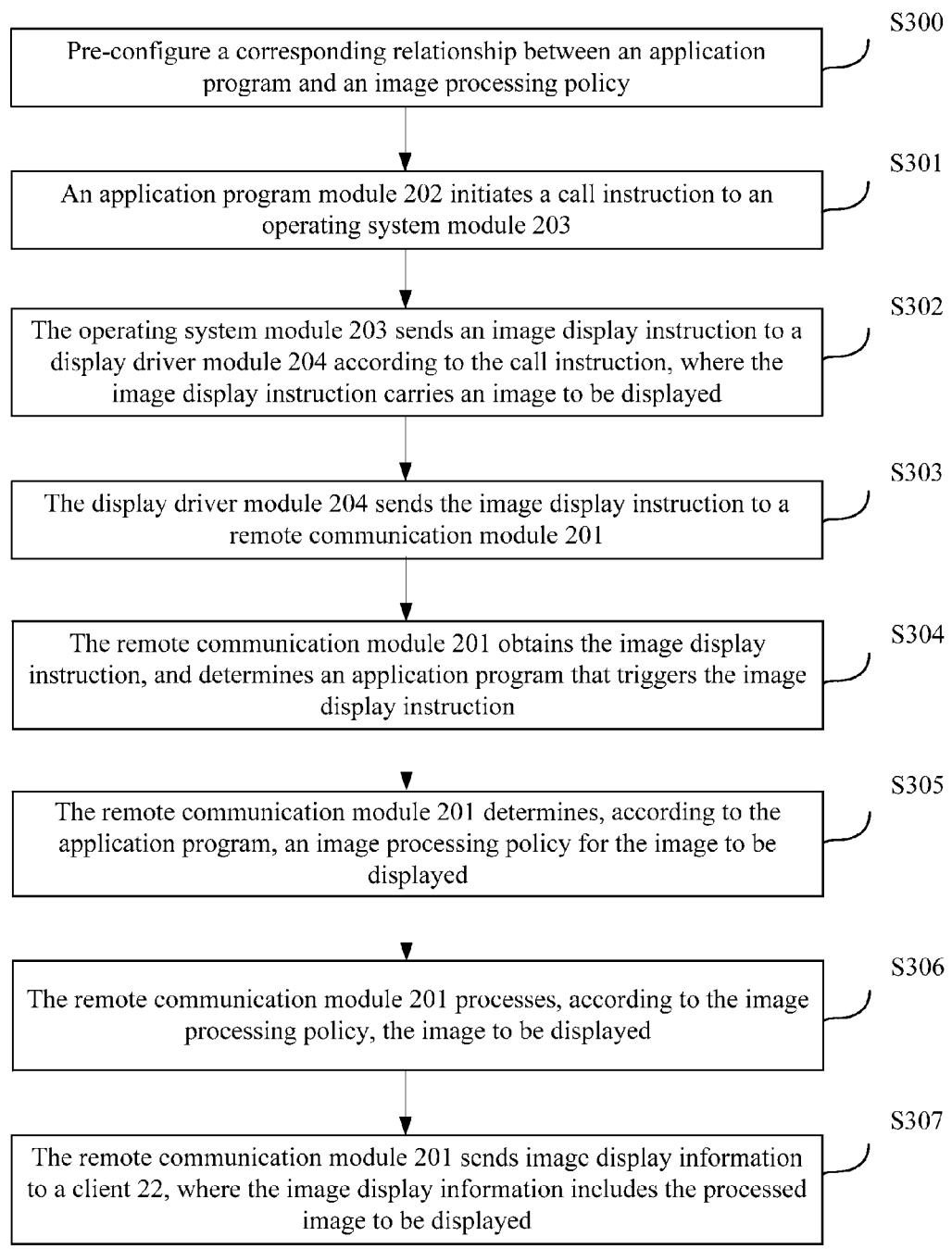
FIG. 3 is a flowchart of another method according to an embodiment of the present invention.

In the system architecture embodiment shown in FIG. 2, another image display method according to an embodiment of the present invention, as shown in FIG. 3, includes the following steps.

S300. Pre-configure a mapping relationship between an application program and an image processing policy.

To solve a series of problems caused by the prior art that an image processing policy is determined according to an image type, the embodiment of the present invention proposes a method of configuring an image processing policy with respect to an application program, that is, pre-configuring a mapping relationship between the application program and the image processing policy, so that a corresponding module queries the mapping relationship according to application program information and determines a corresponding image processing policy.

Specifically, if the image processing policy includes an image compression policy, the S300 is as follows:

S300-*a*. Configure a first mapping relationship, where the first mapping relationship includes image compression policies corresponding to different application programs.

When the image compression policy specifically includes a lossless compression policy, the configuring a first mapping relationship includes: configuring a first mapping relationship between the lossless compression policy and first type application software, or configuring a first process name set that uses the lossless compression policy, where, preferably, the first type application software mainly refers to software requiring a high image display quality, for example, the software may include medical industry software or professional drawing software; and the first process name set may include: xtop.exe (pro/E, drawing software), CNEXT.exe (CAITA, drawing software), acad.exe (AutoCAD, drawing software), Revit.exe (Revit, architecture design software), Inventor.exe (Inventor, mechanical design software), 3dsmax.exe (3ds Max, 3D animation production software), Showcase.exe (Showcase, 3D visual creativity software), or the like, and the process name set may be selected and configured according to the actual situation and is not exhaustively described in this embodiment.

When the image compression policy specifically includes a lossy compression policy, the configuring a first mapping relationship includes: classifying the lossy compression policy into multiple lossy compression levels, and configuring a corresponding application software type for each lossy compression level, or configuring a corresponding process name set for each lossy compression level, where each lossy compression level includes a lossy compression algorithm or level.

If the image processing policy specifically includes an image frequency control policy, the S300 is as follows:

S300-*b*. Configure a second mapping relationship, where the second mapping relationship includes image frequency control policies corresponding to different application programs.

When the image compression policy includes an image frequency control policy whose value is lower than a default value (the default value is a default image display frame rate or delay time of a system), the configuring a second mapping relationship includes: configuring a second mapping relationship between the image frequency control policy whose value is lower than the default value and second type application software, or configuring a second process name set that uses the image frequency control policy whose value is lower than the default value. For some types of software that has many images, if all images are transferred to the client, a large bandwidth will be occupied. Therefore, image frequency control is used. For software having large image traffic, an image frequency control policy whose value is lower than a default value may be used, for example, a default image frequency control policy of a system is 30 frames per second, and in this embodiment, an image frequency control policy whose value is lower than the default value is configured to 20 frames per second. Preferably, the second type application software mainly refers to software having large image traffic, for example, the software may include video-type software; and the second process name set may include: wmplayer.exe (windows Media Player), qqplayer.exe (Tencent QQ Player), splayer.exe (SPlayer), vlc.exe (VLC Player), StormPlayer.exe (Storm Player), or the like, and the process name set may be selected and configured according to the actual situation and is not exhaustively described in this embodiment.

If the image processing policy specifically includes a cursor rendering policy, the S300 is as follows:

S300-*c*. Configure a third mapping relationship, where the third mapping relationship includes cursor rendering policies corresponding to different application programs.

When the cursor rendering policy includes a server cursor rendering policy, the configuring a third mapping relationship includes: configuring a third mapping relationship between the server cursor rendering policy and third type application software, or configuring a third process name set that uses the server cursor rendering policy. The cursor rendering policy includes a server cursor rendering policy and a client cursor rendering policy, where the server cursor rendering policy is that the server performs cursor rendering, and the client cursor rendering policy is that the client performs cursor rendering. Client cursor rendering enables faster response to users, but it is possible that a location deviation exists between a cursor displayed on the image and a cursor automatically drawn by the application program. Server cursor can ensure the consistency between the cursor displayed on the image and the cursor automatically drawn by the application program. Therefore, for some drawing software, surveying and mapping industry software, or game software that requires a high accuracy, server cursor rendering can be used. The third type application software mainly refers to some drawing software, surveying and mapping industry software, or game software that requires a high accuracy. The third process name set may include xtop.exe, vlc.exe, autocad.exe, or the like, and the process name set may be selected and configured according to the actual situation and is not exhaustively described in this embodiment.

Possible image processing policies are listed as examples in this embodiment, such as an image compression policy, an image frequency control policy, and a cursor rendering policy. In practical, according to the embodiment of the present invention and a publicly-known technology, a person skilled in the art may also think of more image policies, which are not detailed any further in the embodiment of the present invention. Additionally, though each policy in the foregoing embodiment is listed separately, a person skilled in the art may clearly understand that, the first mapping relationship, the second mapping relationship, or the third mapping relationship related to the foregoing image compression policy, image frequency control policy, and cursor rendering policy may be configured separately, simultaneously, or in any combination, for example, the first mapping relationship and the second mapping relationship are configured simultaneously, or the first mapping relationship and the third mapping relationship are configured simultaneously, or the three mapping relationships are configured simultaneously. The mapping relationship may be configured in the form of a data table. Each mapping relationship may be configured in one table, or multiple mapping relationships may be configured in one table.

S301. The application program module 202 initiates a call instruction to the operating system module 203.

Preferably, if the client or the system automatically triggers an application program, an application program module 202 of the application program initiates a call instruction to the operating system module 203. Specifically, the call instruction may be a graphic function call instruction.

S302. The operating system module 203 sends an image display instruction to the display driver module 204 according to the call instruction, where the image display instruction carries an image to be displayed.

S303. The display driver module 204 sends the image display instruction to the remote communication module 201.

Preferably, the display driver module 204 may further convert, after receiving the image display instruction, the format of the image display instruction according to a format predefined by the client, and then send the image display instruction with the format converted to the remote communication module 201.

S304. The remote communication module 201 obtains the image display instruction, and determines an application program that triggers the image display instruction.

Specifically, the determining, by the remote communication module 201, an application program that triggers the image display instruction may be implemented in multiple manners. In this embodiment, an exemplary implementation manner is that the remote communication module 201 determines information of a process associated with the image display instruction. Because the application program is executed by a computer through a process, the process associated with the image display instruction may represent the application program that triggers the image display instruction. Further, because the operating system module 203 may allocate process space for each executed process, the process space includes process information. In the case of drawing, the display driver module 204 adapted to execute the image display instruction works in the process space of the process. Therefore, the display driver module 204 may query for process information by using an interface provided by the operating system module 203, for example, obtain a current process ID by using an application program interface API function GetCurrentProcessId or EngGetCurrentProcessId of the Windows operating system, or obtain a process name of the current process by using Windows API functions PsGetCurrentProcess and PsGetProcessImageFileName. The remote communication module 201 may query for a process name corresponding to a process ID by using an interface provided by the operating system module 203, for example, by using application program interface API functions OpenProcess and GetModuleFileName of the Windows operating system. In a specific implementation, the remote communication module 201 or the display driver module 204 may query the operating system module 203 to obtain the process name.

If the remote communication module 201 queries the operating system module 203, the determining information of a process associated with the image display instruction in S304 can be implemented in the following manner.

S304-a1. The remote communication module 201 queries for an identifier of a process associated with the image display instruction from the operating system module 203.

S304-a2. The remote communication module 201 queries for a process name of the process from the operating system module 203 according to the process identifier.

Alternatively S304-a1'. The remote communication module 201 queries for a name of a process associated with the image display instruction from the operating system module 203.

S304-a2'. The remote communication module 201 obtains the process name returned by the operating system module 203.

If the display driver module 204 queries the operating system module 203, the display driver module 204 may further perform the following steps before S303:

S303-a1. The display driver module 204 queries for an identifier of a process associated with the image display instruction from the operating system module 203.

S303-a2. The display driver module 204 queries for a process name of the process from the operating system module 203 according to the process identifier.

Or,

S303-a1'. The display driver module 204 queries for a name of a process associated with the image display instruction from the operating system module 203.

S303-a2'. The display driver module 204 obtains the process name returned by the operating system module 203.

Or,

S303-c1. The display driver module 204 queries for an identifier of a process associated with the image display instruction from the operating system module 203. Correspondingly, in the S303, the display driver module 204 not only sends the image display instruction to the remote communication module 201, but also sends the found process information, that is, the process identifier or process name, to the remote communication module 201.

Correspondingly, if the display driver module 204 sends the found process name to the remote communication module 201 in S303, in S304, the remote communication module 201 obtains the process name carried in the image display instruction; if the display driver module 204 sends the found process identifier to the remote communication module 201 in S303, in S304, the remote communication module 201 queries for the process name of the process from the operating system module 203 according to the process identifier.

Multiple implementation manners for the remote communication module to determine the process of the image display instruction are exemplified above. In summary, multiple flexible implementation manners can be deduced according to the principle, which is mentioned in the embodiments of the present invention, of querying for information in the process space of the operating system module. Specific implementations are not detailed any further in the embodiments of the present invention.

It goes back to the main process. The subsequent process includes the following steps:

S305. The remote communication module 201 determines, according to the application program, an image processing policy for the image to be displayed.

Specifically, if the remote communication module 201 determines the information of the process associated with the image display instruction in S304, the remote communication module 201 queries, according to the process information, the mapping relationship configured in S300, and determines the image processing policy for the image to be displayed.

S306. The remote communication module 201 processes, according to the image processing policy, the image to be displayed.

Specifically, if the image processing policy is a lossless compression policy, the remote communication module 201 performs lossless compression for the image to be displayed; if the image processing policy is a lossy compression policy, the remote communication module 201 performs lossy compression for the image to be displayed according to a level of the lossy compression policy; if the image processing policy is an image frequency control policy, the remote communication module 201 calculates a first interval according to a frequency specified by the image frequency control policy, and performs redundancy elimination for multiple images received in the first interval to obtain one image; if the image processing policy is a server cursor rendering policy, the remote communication module 201 instructs the display driver module 204 to render a cursor on the image to be displayed, and then obtains the rendered image to be displayed returned by the display driver module 204; if the image processing policy includes an image compression policy and an image frequency control policy, the remote communication module 201 calculates a first interval according to a frequency specified by the image frequency control policy, performs redundancy elimination for multiple images received in the first interval to obtain one image, and uses the image compression policy to compress the image that is obtained through the redundancy elimination.

S307. The remote communication module 201 sends an image display message to a client 22, so that the client 22 displays an image according to the image display message, where the image display message includes the processed image to be displayed.

In this embodiment, a mapping relationship between an application program and an image processing policy is configured first; and, after a remote communication module receives an image display instruction, the remote communication module determines an application program that triggers the image display instruction, determines an image processing policy according to the application program, processes an image according to the determined image processing policy, and sends the image to a client for display. Because an image processing program is determined according to an application program currently triggered by the client, the determined image processing policy meets current application requirements of the client, which avoids the problem in the prior art that an image finally displayed on the client does not meet current application requirements of the client when an image processing policy is determined according to image type recognition, and balances a bandwidth occupancy for data transmission between a remote computer and the client. Specifically, because a lossless compression policy is configured for software that requires a high image quality, so that an image to be sent to the client for display can meet high-accuracy and high-emulation image requirements of users; because an image frequency control policy whose value is lower than a default value is configured for large-traffic software such as video software, images sent to a client are images obtained after redundancy elimination, which reduces a bandwidth occupancy between the server and the client and improves the system transmission efficiency; and because a server cursor rendering policy is configured for software that requires a high cursor accuracy, the consistency between a cursor displayed on an image and a cursor automatically drawn by the application program can be ensured, which improves user experience.

Figure 4:
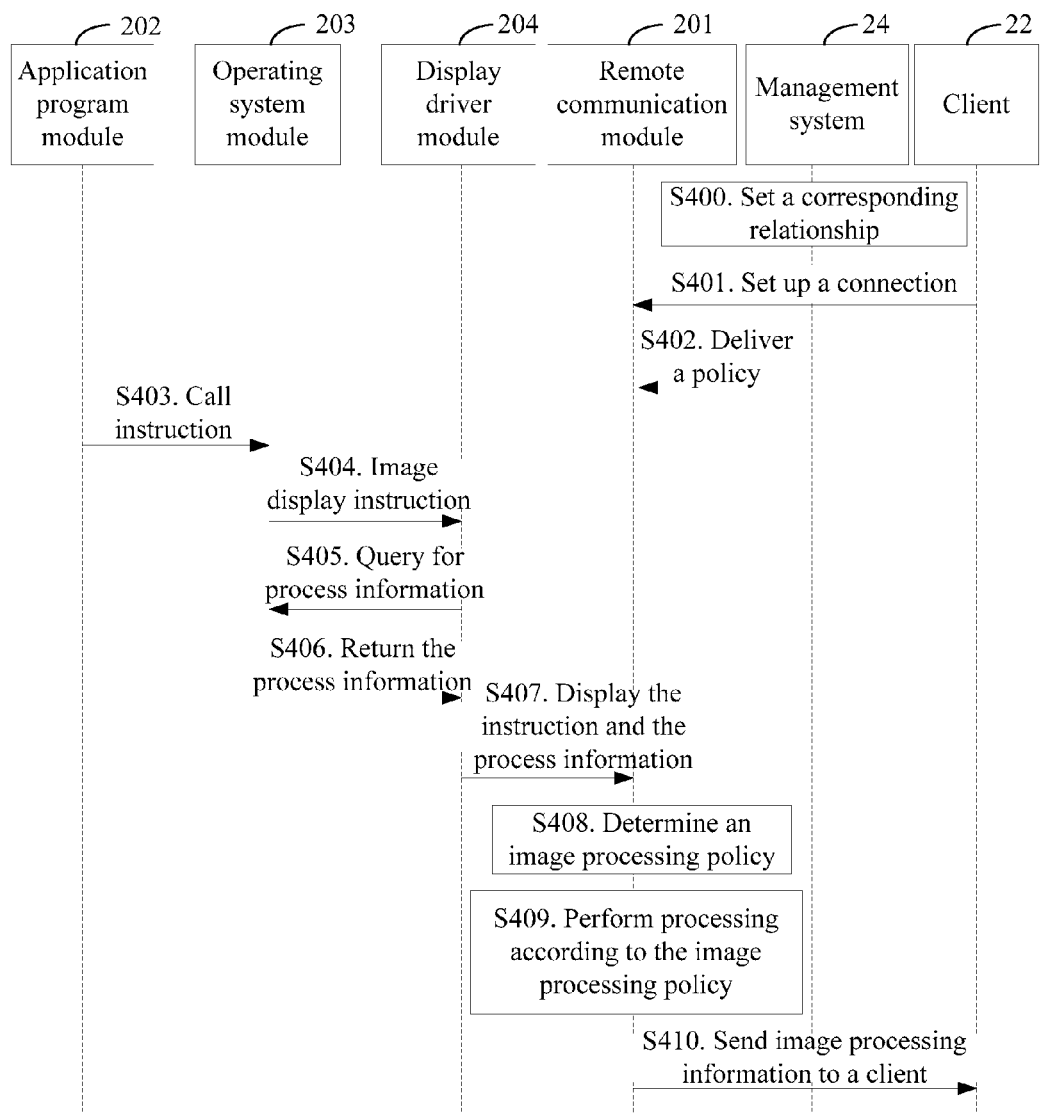
FIG. 4 is a flowchart of another method according to an embodiment of the present invention.

In the system architecture embodiment shown in FIG. 2, another image display method according to an embodiment of the present invention, as shown in FIG. 4, includes the following steps.

S400. In a management system, pre-configure a mapping relationship between an application program and an image processing policy.

The specific configuration form and method of the mapping relationship are similar to those described in S300, which is not detailed herein any further.

S401. A connection is established between virtual machines in a client and a server.

Specifically, a remote desktop connection is established between the client and a remote communication module 201 in the virtual machine.

S402. A management system delivers the mapping relationship between the application program and the image processing policy to the virtual machine.

Specifically, the management system delivers the mapping relationship to the remote communication module 201, and the remote communication module 201 saves the mapping relationship.

S403. The application program module 202 initiates a call instruction to the operating system module 203.

Preferably, if the client or the system automatically triggers an application program, an application program module 202 of the application program initiates a call instruction to the operating system module 203. Specifically, the call instruction may be a graphic function call instruction.

S404. The operating system module 203 sends an image display instruction to the display driver module 204 according to the call instruction, where the image display instruction carries an image to be displayed.

S405. The display driver module 204 queries for an identifier of a process associated with the image display instruction from the operating system module 203.

S406. The display driver module 204 receives the process identifier returned by the operating system module 203, and determines a process name of the process according to the process identifier.

S407. The display driver module 204 sends the image display instruction and the process name to the remote communication module 201.

In another embodiment, the display driver module 204 sends the image display instruction to the remote communication module 201, where the image display instruction carries the process name.

S408. The remote communication module 201 queries the mapping relationship between the application program and the image processing policy according to the process name, and determines an image processing policy for the image to be displayed.

S409. The remote communication module 201 processes, according to the image processing policy, the image to be displayed.

Specifically, if the image processing policy is a lossless compression policy, the remote communication module 201 performs lossless compression for the image to be displayed; if the image processing policy is a lossy compression policy, the remote communication module 201 performs lossy compression for the image to be displayed according to a level of the lossy compression policy; if the image processing policy is an image frequency control policy, the remote communication module 201 calculates a first interval according to a frequency specified by the image frequency control policy, and performs redundancy elimination for multiple images received in the first interval to obtain one image; if the image processing policy is a server cursor rendering policy, the remote communication module 201 instructs the display driver module 204 to render a cursor on the image to be displayed, and then obtains the rendered image to be displayed returned by the display driver module 204; if the image processing policy includes an image compression policy and an image frequency control policy, the remote communication module 201 calculates a first interval according to a frequency specified by the image frequency control policy, performs redundancy elimination for multiple images received in the first interval to obtain one image, and uses the image compression policy to compress the image that is obtained through the redundancy elimination.

S410. The remote communication module 201 sends an image display message to a client 22, so that the client 22 displays an image according to the image display message, where the image display message includes the processed image to be displayed.

In this embodiment, a mapping relationship between an application program and an image processing policy is configured first; and, after a remote communication module receives an image display instruction, the remote communication module determines an application program that triggers the image display instruction, determines an image processing policy according to the application program, processes an image according to the determined image processing policy, and sends the image to a client for display. Because an image processing program is determined according to an application program currently triggered by the client, the determined image processing policy meets current application requirements of the client, which avoids the problem in the prior art that an image finally displayed on the client does not meet current application requirements of the client when an image processing policy is determined according to image type recognition. Specifically, because a lossless compression policy is configured for software that requires a high image quality, so that an image to be sent to the client for display can meet high-accuracy and high-emulation image requirements of users; because an image frequency control policy whose value is lower than a default value is configured for large-traffic software such as video software, images sent to a client are images obtained after redundancy elimination, which reduces a bandwidth occupancy between the server and the client and improves the system transmission efficiency; and because a server cursor rendering policy is configured for software that requires a high cursor accuracy, the consistency between a cursor displayed on an image and a cursor automatically drawn by the application program can be ensured, which improves user experience.

Apparatus Embodiment

Figure 5:
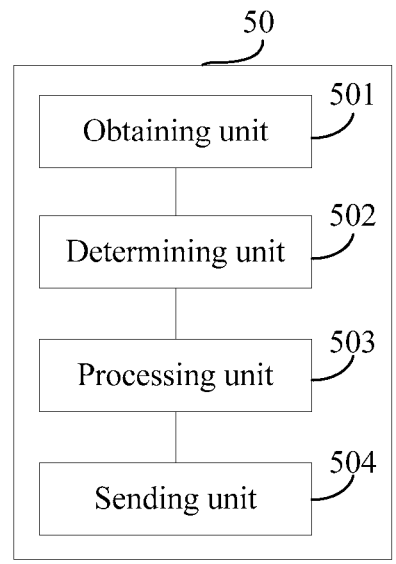
FIG. 5 is a composition diagram of an image display apparatus according to an embodiment of the present invention.

As shown in FIG. 5, an image display apparatus according to an embodiment of the present invention includes:

an obtaining unit 501, adapted to obtain an image display instruction, where the image display instruction carries an image to be displayed;

a determining unit 502, adapted to determine an application program that triggers the image display instruction;

a processing unit 503, adapted to process, according to the application program determined by the determining unit 502, the image to be displayed; and a sending unit 504, adapted to send an image display message to a client, so that the client displays an image according to the image display message, where the image display message includes the image to be displayed that has been processed by the processing unit 503.

Figure 6:
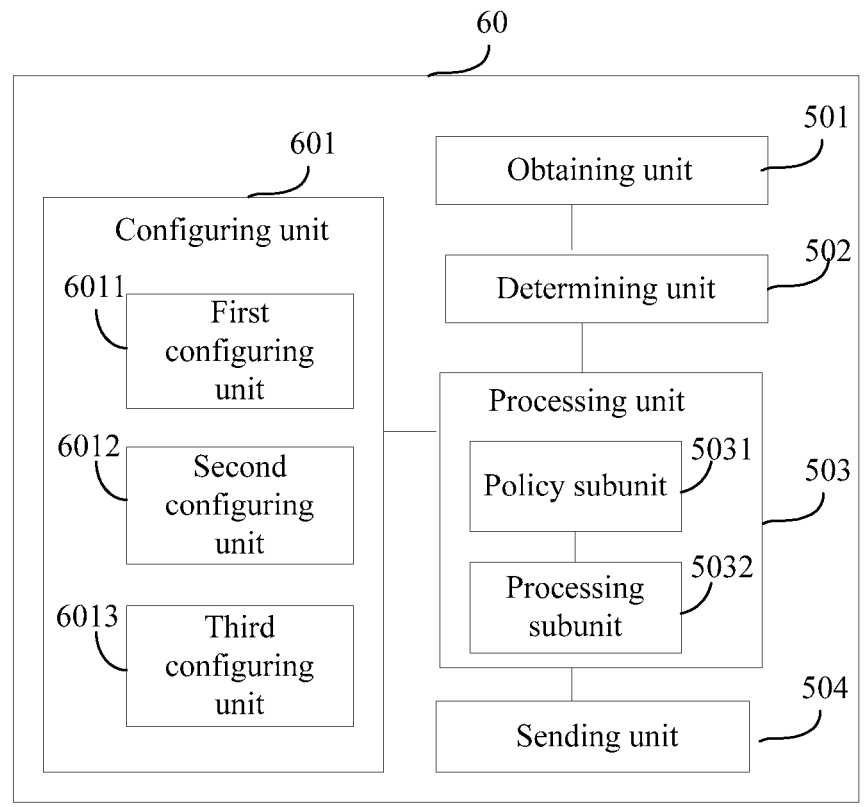
FIG. 6 is a composition diagram of another image display apparatus according to an embodiment of the present invention.

Preferably, as shown in FIG. 6, in another apparatus embodiment provided in the embodiments of the present invention, the processing unit 503 includes:

a policy subunit 5031, adapted to determine, according to the application program determined by the determining unit 502, an image processing policy for the image to be displayed; and a processing subunit 5032, adapted to process, according to the image processing policy, the image to be displayed.

Preferably, the apparatus further includes a configuring unit 601, adapted to pre-configure a mapping relationship between the application program and the image processing policy, where the policy subunit 5031 is specifically adapted to query the mapping relationship according to the application program determined by the determining unit, and determine the image processing policy for the image to be displayed.

Preferably, the configuring unit 601 includes:

a first configuring subunit 6011, adapted to configure a first mapping relationship, where the first mapping relationship includes image compression policies corresponding to different application programs.

The image compression policy includes a lossless compression policy, and the first configuring subunit 6011 is specifically adapted to:

configure a first mapping relationship between the lossless compression policy and first type application software, or configure a first process name set that uses the lossless compression policy.

The image compression policy includes a lossy compression policy, and the first configuring subunit 6011 is specifically adapted to:

classify the lossy compression policy into multiple lossy compression levels; and configure a corresponding application software type for each lossy compression level, or configure a corresponding process name set for each lossy compression level.

Preferably, the configuring unit 601 includes:

a second configuring subunit 6012, adapted to configure a second mapping relationship, where the second mapping relationship includes image frequency control policies corresponding to different application programs.

Where, the image compression policy includes an image frequency control policy whose value is lower than a default value, where the default value is a default image display frame rate or delay time of a system; and the second configuring subunit 6012 is specifically adapted to:

configure a second mapping relationship between the image frequency control policy whose value is lower than the default value and second type application software, or configure a second process name set that uses the image frequency control policy whose value is lower than the default value.

Preferably, the configuring unit 601 includes:

a third configuring subunit 6013, adapted to configure a third mapping relationship, where the third mapping relationship includes cursor rendering policies corresponding to different application programs.

Where, the cursor rendering policy includes a server cursor rendering policy, and the third configuring subunit is specifically adapted to:

configure a third mapping relationship between the server cursor rendering policy and third type application software, or configure a third process name set that uses the server cursor rendering policy.

Preferably, the determining unit 502 is specifically adapted to determine a process currently associated with the image display instruction.

Preferably, the determining unit 502 is specifically adapted to: query for a name of the process currently associated with the image display instruction from an operating system, or query for an identifier of the process currently associated with the image display instruction from an operating system and determine a process name according to the process identifier; or, obtain a name of the process currently associated with the image display instruction that is carried in the image display instruction, or obtain an identifier of the process currently associated with the image display instruction that is carried in the image display instruction and determine a process name according to the process identifier.

Preferably, the processing subunit 5032 includes any one or any combination of the following modules:

a compression module, adapted to: if the image processing policy includes an image compression policy, compress, according to the image compression policy, the image to be displayed;

a redundancy elimination module, adapted to: if the image processing policy includes an image frequency control policy, calculate a first interval according to a frequency specified by the image frequency control policy, and perform redundancy elimination for multiple images to be displayed that are received in the first interval to obtain one image to be displayed; and a cursor processing module, adapted to: if the image processing policy includes a server cursor rendering policy, render a cursor on the image to be displayed.

Figure 7:
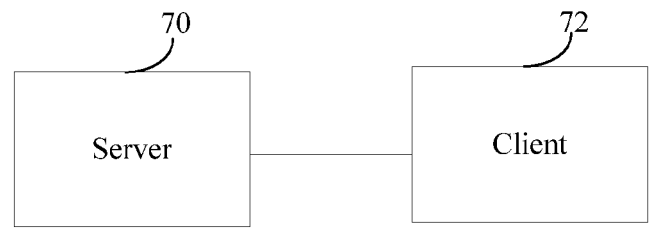
FIG. 7 is a composition diagram of an image display system according to an embodiment of the present invention.

As shown in FIG. 7, an image display system according to an embodiment of the present invention includes:

a server 70, adapted to obtain an image display instruction, where the image display instruction carries an image to be displayed, determine an application program that triggers the image display instruction, process, according to the application program, the image to be displayed, and send an image display message to a client, where the image display message includes the processed image to be displayed; and the client 72, adapted to receive the image display message sent by the server, and display an image according to the image display message.

Figure 8:
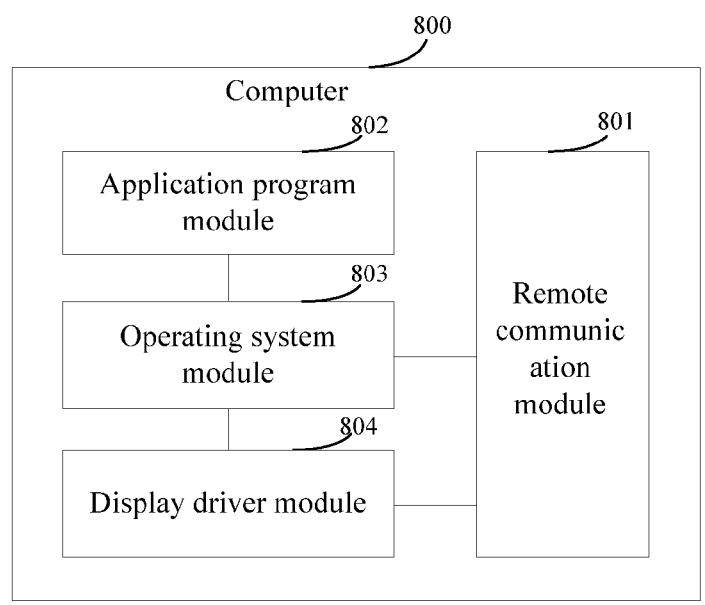
FIG. 8 is a composition diagram of a computer according to an embodiment of the present invention.

An embodiment of the present invention further provides a computer. As shown in FIG. 8, the computer shown in FIG. 8 may be a virtual machine shown in FIG. 2 or a physical server.

The computer includes: an application program module 802, an operating system module 803, an display driver module 804, and a remote communication module 801, where: the operating system module 803 is adapted to send an image display instruction to the display driver module 804 according to a call instruction of the application program module 801; the display driver module 804 sends the image display instruction to the remote communication module 801 after receiving the image display instruction sent by the operating system module 803; and the remote communication module 801 is adapted to obtain the image display instruction sent by the display driver module, where the image display instruction carries an image to be displayed, determine an application program that triggers the image display instruction, process, according to the application program, the image to be displayed, and send an image display message to a client, so that the client displays an image according to the image display message, where the image display message includes the processed image to be displayed.

Specifically, the remote communication module 801 is specifically adapted to determine, according to the application program, an image processing policy for the image to be displayed, and process, according to the image processing policy, the image to be displayed.

Preferably, the remote communication module 801 is further adapted to obtain a pre-configured mapping relationship between the application program and the image processing policy; and, the remote communication module 801 queries the mapping relationship according to the application program, and determines the image processing policy for the image to be displayed.

Preferably, the display driver module 804 is further adapted to query for information of a process currently associated with the image display instruction from the operating system module 803, carry the process information in the image display instruction, and send the image display instruction to the remote communication module 801; and the remote communication module 801 obtains the information of the process currently associated with the image display instruction that is carried in the image display instruction, and determines, according to the process information, the image processing policy for the image to be displayed.

Preferably, the remote communication module 801 is further adapted to query for information of a process currently associated with the image display instruction from the operating system module 803, and determine, according to the process information, the image processing policy for the image to be displayed.

Figure 9:
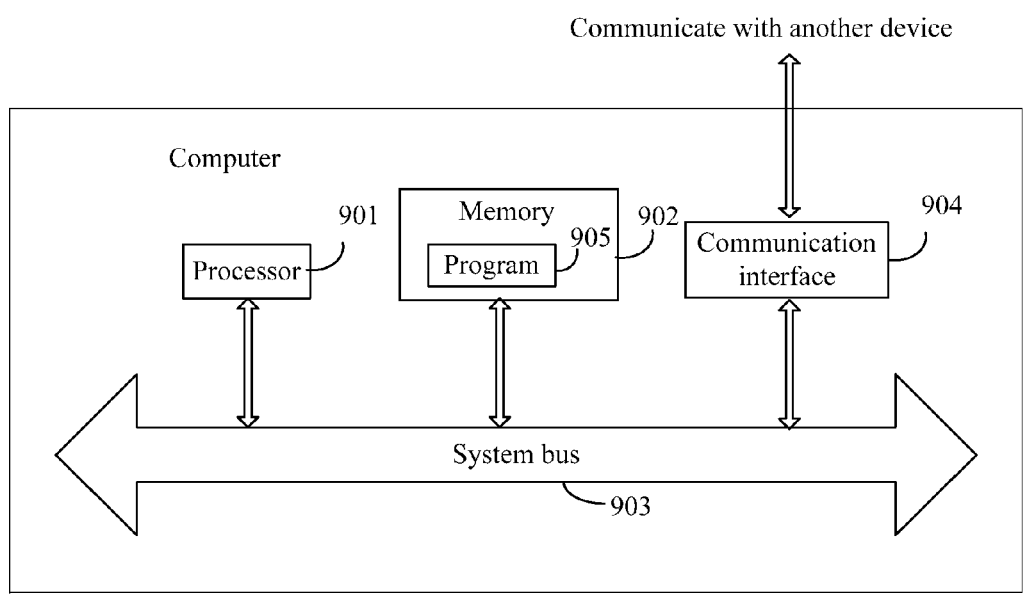
FIG. 9 is a composition diagram of a computer according to an embodiment of the present invention.

FIG. 9 is a schematic structural diagram of a computer according to an embodiment of the present invention. The computer according to the embodiment of the present invention may include:

a processor 901, a memory 902, a system bus 904, and a communication interface 905. The CPU 901, the memory 902, and the communication interface 905 are connected through the system bus 904 and complete mutual communication.

The processor 901 may be a single-core or multi-core central processing unit, or a specific integrated circuit, or is configured to one or multiple integrated circuits implementing the embodiments of the present invention.

The memory 902 may be a high-speed RAM memory or a non-volatile memory (non-volatile memory), for example, at least one disk memory.

The memory 902 is adapted to store a computer execution instruction 903. Specifically, the computer execution instruction 903 may include program codes.

When the computer is running, the processor 901 runs the computer execution instruction 903, and may execute any of the method processes in FIG. 1, FIG. 3, or FIG. 4.

A person of ordinary skill in the art should understand that, each aspect of the present invention or each possible implementation manner of each aspect may be specifically implemented as systems, methods, or computer program products. Therefore, each aspect of the present invention or each possible implementation manner of each aspect may use forms of complete hardware embodiments, complete software embodiments (including firmware, resident software, and so on), or embodiments combining software and hardware, which are uniformly referred to as "circuit", "module", or "system" herein. Furthermore, each aspect of the present invention or each possible implementation manner of each aspect may use forms of computer program products. Computer program products refer to computer readable program codes stored in a computer readable medium.

A computer readable medium may be a computer readable signal medium or a computer readable storage medium. The computer readable storage medium includes but is not limited to electronic, magnetic, optical, electromagnetic, infrared, or semiconductor systems, devices, or apparatuses, or any appropriate combination of the foregoing items, such as a random access memory (RAM), a read-only memory (ROM), an erasable programmable read-only memory (EPROM or Flash memory), an optical fiber, and a portable read-only memory (CD-ROM).

Processors in computers read computer readable program codes stored in a computer readable medium, so that the processors can execute functions and actions specified in one step or a combination of the steps in the flowcharts, and an apparatus implementing functions and actions specified in one block or a combination of blocks in the block diagrams is generated.

Computer readable program codes can be completely executed on user computers, partially executed on user computers, used as separate software packages, partially on user computers and partially on remote computers, or completely executed on remote computers or servers. It should also be noted that, in certain alternative implementation solutions, functions denoted in each step of the flowcharts or in each block of the block diagrams may not occur according to the sequence denoted in the diagrams. For example, depending on the involved functions, two steps or two blocks successively marked may be performed concurrently, or these blocks sometimes may be performed in a reverse order.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solutions. A person skilled in the art may use different methods to implement the described functions for each particular application, but it should not be considered that the implementation goes beyond the scope of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image processing method of a server, comprising:
   configuring corresponding relationships between application program information and image processing policies, wherein the application program information comprises names or types of different processes;
   obtaining an image display instruction, wherein the image display instruction carries an image;
   determining a name or a type of a process that triggers the image display instruction;
   querying the corresponding relationships to determine an image processing policy according to the name or the type of the process; and
   processing the image according to the image processing policy.

2. The method according to claim 1, wherein configuring the corresponding relationships between the application program information and the image processing policies comprises:
   configuring a first relationship, wherein the first relationship is a relationship between the application program information and image compression policies.

3. The method according to claim 2, wherein the image compression policies comprise a lossless compression policy, and configuring the first relationship comprises:
   configuring a relationship between the lossless compression policy and a first-type process, or configuring a relationship between the lossless compression policy and a first process name set that uses the lossless compression policy.

4. The method according to claim 2, wherein the image compression policies comprise a lossy compression policy, and configuring the first relationship comprises:
   classifying the lossy compression policy into multiple lossy compression levels; and
   configuring a relationship between each lossy compression level and a process type, or configuring a relationship between each lossy compression level and a process name set.

5. The method according to claim 2, wherein querying the corresponding relationships to determine an image processing policy for the image according to the name or the type of the process comprises:
   querying the first relationship to determine an image compression policy for the image according to the name or the type of the process;
   and wherein processing the image according to the image processing policy comprises:
   compressing the image according to the image compression policy.

6. The method according to claim 1, wherein configuring the corresponding relationships between the application program information and the image processing policies comprises:
   configuring a second relationship, wherein the second relationship is a relationship between the application program information and image frequency control policies.

7. The method according to claim 6, wherein the image frequency control policies comprise a low-value image frequency control policy, wherein when the low-value image frequency control policy is applied, an image display frame rate or a delay time of a system is set lower than a default image display frame rate or a default delay time of the system; and and wherein configuring the second relationship comprises:

configuring a relationship between the low-value image frequency control policy and names or types of processes that uses the low-value image frequency control policy.

8. The method according to claim 7, wherein processing the image according to the image processing policy comprises:

calculating a first interval according to a frequency specified by the image frequency control policy, and performing a redundancy elimination for multiple images that are received in the first interval to obtain the image to be processed.

9. The method according to claim 1, wherein configuring the corresponding relationships between the application program information and the image processing policies comprises:

configuring a third relationship, wherein the third relationship is a relationship between the application program information and cursor rendering policies.

10. The method according to claim 9, wherein querying the corresponding relationships to determine an image processing policy for the image according to the name or the type of the process comprises:

querying the third relationship to determine a cursor rendering policy for the image according to the name or the type of the process;

and wherein processing the image according to the image processing policy comprises:

rendering a cursor on the image according to the cursor rendering policy.

11. A server comprising at least a processor circuitry operating in conjunction with at least a memory storing program codes as a plurality of modules, wherein the plurality of modules comprise:

a configuration module, which causes the processor circuitry to configure corresponding relationships between application program information and image processing policies, wherein the application program information comprises names or types of different processes, an image processing module, which causes the processor circuitry to obtain an image display instruction, wherein the image display instruction carries an image, determine a name or a type of a process that triggers the image display instruction, query the corresponding relationships to determine an image processing policy according to the name or the type of the process, and process the image according to the image processing policy; and a remote communication module, which causes the processor circuitry to send image display information containing the processed image to a client through a remote communication protocol.

12. The server according to claim 11, wherein the corresponding relationships between application program information and image processing policies comprise a first relationship, and the first relationship is a relationship between the application program information and image compression policies.

13. The server according to claim 11, wherein the corresponding relationships between application program information and image processing policies comprise a second relationship, wherein the second relationship is a relationship between the application program information and image frequency control policies.

14. The server according to claim 11, wherein the corresponding relationships between application program information and image processing policies comprise a third relationship, wherein the third relationship is a relationship between the application program information and comprises cursor rendering policies.

15. A computing device, comprising a processor, a memory, a bus, and a communication interface, wherein the memory is configured to store computer executable instructions; the processor is connected to the memory through the bus and is configured to execute the instructions, wherein the instructions comprise:

instructions for configuring corresponding relationships between application program information and image processing policies, wherein the application program information comprises names or types of different processes;

instructions for obtaining an image display instruction, wherein the image display instruction carries an image;

instructions for determining a name or a type of a process that triggers the image display instruction;

instructions for querying the corresponding relationships to determine an image processing policy according to the name or the type of the process; and instructions for processing the image according to the image processing policy.

16. A computer program product comprising non-transitory computer readable medium storing a computer executable instructions, wherein, when a processor of a computer executes the instructions, the computer performs the following process:

configuring corresponding relationships between application program information and image processing policies, wherein the application program information comprises names or types of different processes;

obtaining an image display instruction, wherein the image display instruction carries an image;

determining a name or a type of a process that triggers the image display instruction;

querying the corresponding relationships to determine an image processing policy according to the name or the type of the process; and processing the image according to the image processing policy.

* * * * *